(12) United States Patent
Chevalier

(10) Patent No.: US 12,247,882 B2
(45) Date of Patent: Mar. 11, 2025

(54) METHOD AND SYSTEM COMPRISING ENTRANCE OPTICS, INTERFEROMETER, AND TRANSFORMATION LAYER FOR DETECTION OF ELECTROMAGNETIC RADIATION

(71) Applicant: Lyseonics BV, Deinze (BE)

(72) Inventor: Philippe Arthur Jean Ghislain Chevalier, Deinze (BE)

(73) Assignee: Lyseonics BV, Deinze (BE)

(\*) Notice: Subject to any disclaimer, the term of this patent is extended or adjusted under 35 U.S.C. 154(b) by 912 days.

(21) Appl. No.: 17/286,059

(22) PCT Filed: Oct. 29, 2018

(86) PCT No.: PCT/EP2018/079582
§ 371 (c)(1),
(2) Date: Apr. 16, 2021

(87) PCT Pub. No.: WO2020/088737
PCT Pub. Date: May 7, 2020

(65) Prior Publication Data
US 2021/0341337 A1 Nov. 4, 2021

(51) Int. Cl.
*G01J 5/00* (2022.01)
*G01J 5/02* (2022.01)
(Continued)

(52) U.S. Cl.
CPC ........... *G01J 5/0003* (2013.01); *G01J 5/0265* (2013.01); *G01J 5/0859* (2013.01);
(Continued)

(58) Field of Classification Search
CPC ............. G01J 5/0003; G01J 2005/0092; G01J 2005/0077; G01J 5/0265; G01J 2005/583;
(Continued)

(56) References Cited

U.S. PATENT DOCUMENTS 4,275,302 A 6/1981 Imbert et al.
4,959,546 A 9/1990 Bly
(Continued)

FOREIGN PATENT DOCUMENTS

CN 1902473 A 1/2007
CN 108474642 A 8/2018
(Continued)

OTHER PUBLICATIONS

Soviet Journal of Optical Technology, vol. 34, No. 6, Nov.-Dec. 1967, Optical Society of America, Vavilov Optical Research Institute, USSR.
(Continued)

*Primary Examiner* — Allen C. Ho
(74) *Attorney, Agent, or Firm* — Hoffmann & Baron, LLP

(57) ABSTRACT

The invention relates to a device and method for imaging electromagnetic radiation from an object. The device comprises entrance optics for allowing the electromagnetic radiation to enter the device, comprising an image plane onto which an image of the object is to be imaged. The device comprises an interferometer having a measurement arm, wherein the image plane is in the measurement arm. The device comprises a transformation layer, at the image plane, for transforming the electromagnetic radiation into a spatiotemporal variation of the refractive index of the transformation layer for causing spatiotemporal optical phase differences in the measurement arm of the interferometer that are processed to result in a representative image of the object.

18 Claims, 8 Drawing Sheets

(51) Int. Cl.
  *G01J 5/08* (2022.01)
  *G01N 21/17* (2006.01)
  *G01N 21/47* (2006.01)
  *G01J 5/58* (2022.01)

(52) U.S. Cl.
  CPC ........... *G01N 21/171* (2013.01); *G01N 21/47* (2013.01); *G01N 21/4795* (2013.01); *G01J 2005/0077* (2013.01); *G01J 2005/0092* (2013.01); *G01J 2005/583* (2013.01)

(58) Field of Classification Search
  CPC ...... G01N 21/17; G01N 21/171; G01N 21/47; G01N 21/4795
  USPC .................. 356/128, 504; 359/321, 326, 589
  See application file for complete search history.

(56) References Cited

U.S. PATENT DOCUMENTS

| | | | |
|---|---|---|---|
| 5,072,120 A | | 12/1991 | Siewick |
| 5,365,065 A | | 11/1994 | Power |
| 5,450,205 A | * | 9/1995 | Sawin ................ G01B 11/0675 216/60 |
| 6,665,075 B2 | * | 12/2003 | Mittleman ............. G01N 21/49 356/450 |
| 7,177,030 B2 | * | 2/2007 | Leizerson .......... G01B 11/0675 356/504 |
| 7,365,858 B2 | * | 4/2008 | Fang-Yen .......... G01B 9/02072 356/489 |
| 7,491,922 B1 | | 2/2009 | Deliwala et al. |
| 7,767,951 B1 | | 8/2010 | Deliwala et al. |
| 7,820,968 B2 | * | 10/2010 | Sakemoto ................ H04N 5/33 250/330 |
| 8,153,948 B1 | | 4/2012 | Deliwala et al. |
| 8,309,899 B1 | | 11/2012 | Deliwala et al. |
| 8,854,628 B2 | * | 10/2014 | Colonna de Lega ........................ G01B 9/02057 356/504 |
| 10,241,028 B2 | * | 3/2019 | Rowe ........................ G01J 9/02 |
| 10,495,863 B2 | * | 12/2019 | Lin .................... G02B 21/0008 |
| 2005/0082480 A1 | | 4/2005 | Wagner et al. |
| 2009/0078873 A1 | | 3/2009 | Sakemoto et al. |
| 2012/0157160 A1 | | 6/2012 | Ozcan et al. |
| 2016/0004057 A1 | | 1/2016 | Lin et al. |

FOREIGN PATENT DOCUMENTS

| | | |
|---|---|---|
| JP | 661234321 A | 10/1986 |
| JP | 2008-264888 A | 11/2008 |
| JP | 2009-42164 A | 2/2009 |
| JP | 2014-503822 A | 2/2014 |
| JP | 2016-18215 A | 2/2016 |
| JP | 2016105113 A | 6/2016 |
| JP | 2017207304 A | 11/2017 |
| WO | 2012088351 A2 | 6/2012 |

OTHER PUBLICATIONS

A.C.P. Rocha et al., "Measurements of Refractive Indices and Thermo-Optical Coefficients Using a White-Light Michelson Interferometer", Applied Optics, vol. 55, No. 24, pp. 6639-6643; 2016.

Japanese Office Action dated Jul. 8, 2022 for counterpart Japanese Application No. 2021-523298.

Kikuta, Hisao, et al., "Distance Measurement by the Wavelength Shift of Laser Diode Light," Applied Optics, vol. 25, No. 17, pp. 2976-2980 (1986).

Flushberg, Allen, et al., "Highly Sensitive Infrared Imager with Direct Optical Readout," Infrared Technology and Applications XXXII, Proc. of SPIE, vol. 6206, International Society for Optics and Photonics, pp. 62061E-1 to 62061E-18, 2006.

De Nicola, Sergio, et al. "Interferometric Measurement of Thermo-Optic Coefficients of Transparent Materials," Photonics, Devices, and Systems. vol. 4016. International Society for Optics and Photonics, 1999.

Gordon, J. P., et al. "Long-Transient Effects in Lasers with Inserted Liquid Samples," Journal of Applied Physics, vol. 36, No. 1, pp. 3-8 (1965).

Jiang, Yan, et al. "Azo Biphenyl Polyurethane: Preparation, Characterization and Application for Optical Waveguide Switch," Optical Materials, vol. 75, pp. 858-868 (2018).

Malacara, Daniel, "Optical Shop Testing," 3rd Ed., John Wiley & Sons, Chapter 14, pp. 547-666, 2007.

Flusberg, Allen, et al. "Thermal-to-Visible Transducer (TVT) for Thermal-IR Imaging," Infrared Technology and Applications XXXIV, Proc. of SPIE, vol. 6940, International Society for Optics and Photonics, p. 694015, 2008.

Wolfe, William, L., "The Infrared Handbook, Chapter 7, Optical Materials," pp. 7.81-7.82 (1965).

PCT International Search Report and Written Opinion corresponding to International Application No. PCT/EP2018/079582 dated Sep. 27, 2019.

Dennis C. Ghiglia, Mark D. Pritt, "Two-Dimensional Phase Unwrapping: Theory, Algorithms, and Software," John Wiley & Sons, Inc. (1998). ISBN: 978-0-471-24935-1.

Chinese Office Action for counterpart Chinese Patent Application No. 201880099126.5 dated Mar. 23, 2024.

\* cited by examiner

METHOD AND SYSTEM COMPRISING ENTRANCE OPTICS, INTERFEROMETER, AND TRANSFORMATION LAYER FOR DETECTION OF ELECTROMAGNETIC RADIATION

CROSS-REFERENCE TO RELATED APPLICATIONS

This application is the U.S. National Phase Application of International Application No. PCT/EP2018/079582, filed on Oct. 29, 2018, the disclosure of which is incorporated by reference herein in its entirety for all purposes.

FIELD OF THE INVENTION

The present invention relates generally to methods and devices for the detection of electromagnetic radiation. More in particular, the present invention relates to methods and devices for the detection of thermal radiation.

BACKGROUND OF THE INVENTION

The spectrum of electromagnetic radiation can be represented by the blackbody radiation curve known as the Planck radiation law and given by the equation $$u(T, v) = \left(\frac{8\pi v}{c^3}\right)\left(\frac{hv}{\exp\left(\frac{hv}{kT}\right) - 1}\right) \quad (1)$$

where u(T, v) is the radiation energy per unit volume and unit frequency interval at the temperature T. For practical purpose one uses the emissive power of a black-body surface at temperature T given by:

$$w(T, \lambda) = \frac{2\pi c^2 h}{\lambda^5 \left(\exp\left(\frac{hc}{\lambda kT}\right) - 1\right)} \quad (2)$$

When integrating the emissive power equation, the total power radiated by unit area of a black-body can be found to be:

$$W = \sigma T^4 \quad (3)$$

where σ is Stefan's constant.

Electromagnetic radiation detectors have been developed for detecting specific bands of the electromagnetic spectrum. An important class of these detectors are thermal infrared detectors. Thermal infrared detectors can be divided in cooled and un-cooled detectors. Cooled detectors are known to be expensive and have spatial resolutions that are inferior to image sensors for the visible spectrum, such as standard CCD, CMOS and InGaAs imager sensors. The un-cooled detectors can be divided in detectors controlled by a thermo-electric cooler (TEC) or by those having no thermo-electric cooler (TEC-less). Many of the un-cooled detectors are based on micro-bolometers that use micro-mechanical sensor (MEMS) technology. Recently an un-cooled high definition (1080p) thermal camera (VAYU HD) was introduced by Sierra-Olympic based on 1920×1200 un-cooled VOx microbolometer with pixel pitch of 12 micron. FLIR Systems thermal imaging cameras have been introduced in the BMW Night Vision systems such that people and animals can be detected at night at a range of about 300 m, which is much further than with headlights. The worldwide infrared imaging market is forecast to reach 7.3 billion US dollars by 2023. Many companies worldwide invest a lot of money in finding low-cost production techniques for high-performance thermal detectors.

The U.S. Pat. No. 4,275,302 describes a method and device for converting thermal images into secondary images, e.g. visible images. The preferred mechanism in U.S. Pat. No. 4,275,302 is based on the physical deformation of a liquid-liquid interface.

The U.S. Pat. No. 5,072,120 describes a family of electromagnetic imagers. It is based on an optical read-out of a thermal image that is embedded in a fluid, particularly a gas, preferably sulfur hexafluoride (SF6) gas. Temperature induced spatial variation of the refractive index is measured using typical interferometric setups. The preferred mechanism in U.S. Pat. No. 5,072,120 for altering the index of refraction of the medium in response to an infrared signal is the vibrational to translational energy exchange.

The U.S. Pat. No. 5,365,065 describes a sensitive interferometric parallel thermal-wave imager that is used for characterizing samples that are prepared in a proper way to extract information of the sample. The invention uses an excitation beam that is preferentially a laser such as to increase the temperature of the sample and can be classified as a non-passive imager. The paper of Allen Flusberg and Shrenik Deliwala ("Highly sensitive infrared imager with direct optical readout", Infrared Technology and Applications XXXII, Proc. of SPIE Vol. 6206 (page 62061E-1 to 62061E-18) (2006), doi:10.1117/12.669353) describes a Fabry-Perot Interferometer used in the conversion of IR radiation to visible light. The paper of Allen Flusberg et al. ("Thermal-to-Visible Transducer (TVT) for Thermal-IR imaging", Infrared Technology and Applications XXXIV, Proc. of SPIE Vol. 6940, 694015, (2008), doi: 10.1117/12.783013), describe the characteristics of the requisite pixelated arrays that have been fabricated. The U.S. Pat. No. 7,491,922 B1, U.S. Pat. Nos. 7,767,951, 8,153,948 B1 and U.S. Pat. No. 8,309,899 B1 apply the results of the findings of the hereabove mentioned papers. The preferred absorber material is a nitrocellulose film with a low-finesse coating (pellicle). Nitrocellulose is known to have hazards and safety issues. The preferred mechanism in the U.S. Pat. No. 7,491,922 B1, U.S. Pat. Nos. 7,767,951, 8,153,948 B1 and U.S. Pat. No. 8,309,899 B1 are changes in the optical thickness of the transducer from heating due to absorbed IR radiation resulting in the modulation of the reflectivity of the transducer as seen by the probe laser beam. It is also stated in the hereabove mentioned papers that the manufacturing time will be approximately 1 to 2 weeks once fully in production.

The patent US 2005/0082480 A1 describes and infrared camera system. The preferred mechanism uses pixels that have a passband that shifts in wavelength, due to a refractive index change, as the temperature of the pixel changes. The thermally-tunable optical filter responds to IR energy radiated by a scene to be imaged.

SUMMARY OF THE INVENTION

It is an object of the present invention to provide an electromagnetic radiation detector which solves problems associated with the prior art.

Alternatively, or additionally, it is an object of the present invention to convert electromagnetic images at wavelengths, such as infrared, millimeter and microwave, to useful wavelengths, which can be utilized by imaging devices, such as cameras.

Briefly, the present invention relates to an electromagnetic imager device for imaging objects, for example, in the infrared, millimeter and/or microwave wavelengths and converting the images of these objects into useful wavelengths which visible light imaging devices, such as CCD, and CMOS and InGaAs sensors, can record, and/or can be seen with the naked eye. Herein, the term 'visible' is intended to indicate visible to the naked human eye. The term 'invisible' is intended to indicate invisible to the naked human eye. It will be appreciated that some devices designed for imaging visible light, such as CCD, CMOS and InGaAs cameras, are suitable for imaging near infra-red light as well, which is invisible to the naked eye. The invention also aims at imaging at infrared wavelengths to which such CCD, CMOS and InGaAs cameras are insensitive.

According to a first aspect is provided a device for imaging, e.g. invisible, electromagnetic radiation from an object. The electromagnetic radiation can include infrared (e.g. far infrared), millimeter wave and microwave radiation. The device includes entrance optics for allowing the electromagnetic radiation to enter the device. The device includes an image plane onto which an image of the object is imaged. The device includes an interferometer having a measurement arm. The image plane is in the measurement arm. The device includes a transformation layer, at the image plane, for transforming the electromagnetic radiation into a spatiotemporal variation of the refractive index of the transformation layer for causing spatiotemporal optical phase differences in the measurement arm of the interferometer representative of the image of the object. Thus, temperature dependent optical phase differences are created inside a given volume of absorbing or excited detector material, i.e. the transformation layer, and subsequently detected by the optical read-out. The temperature dependent optical phase differences are measured with interferometric setups. Hence, a probe beam in the interferometer measurement arm can be used for determining the optical phase changes at the transformation layer. These optical phase changes can be used for generating a visible image representative of the image of the object Typically, in an interferometer a single incoming beam of coherent light will be split into two identical beams. Each of these beams travels an optical path, and they are recombined before arriving at a detector. The optical paths, being the product of the refractive index and the physical distance traveled the respective beams are not equal and create an optical phase difference between them. It is this introduced optical phase difference that creates an interference pattern between the initially identical waves. The optical path difference is diagnostic of anything that changes the optical phase along the optical paths. This could be a dimensional change in the path length itself or a change in the real part of the refractive index along the physical path. The interferometer can include a measurement arm and a reference arm. The image plane is in a first path formed by the measurement arm and includes the probe beam. The reference arm includes a second path shielded from the electromagnetic radiation. The interferometer can determine the (spatiotemporal) optical phase difference between the measurement arm and the reference arm.

The measurement arm of the interferometer can include a measurement beam, wherein the measurement beam can be a coherent light beam. The measurement beam can have a cross-sectional dimension such that the entire image of the object on the image plane is within the cross-sectional area. Hence, the measurement beam can be used for determining the optical phase change at each position within the image of the object at the image plane, e.g. at each pixel of the image of the object at the image plane.

The basic principle of the interferometric technique is that changes in the temperature T of a slab of transparent material of refractive index n and thickness L, here formed by the transformation layer, result in a temperature dependent phase change given by:

$$\frac{d\varphi}{dT} = \frac{2\pi}{\lambda_0} L \left( \frac{dn}{dT} + \alpha(n-1) \right) \quad (4)$$

where $$\alpha = \frac{1}{L}\left(\frac{dL}{dT}\right)$$

is the thermal coefficient of linear expansion of the material and $$\varphi(T) = \frac{2\pi}{\lambda_0} L(T)(n(T)-1)$$

is the temperature dependent optical phase difference (see Sergio De Nicola, Andrea Finizio, Pietro Ferraro, Giovanni Pierattini, Interferometric measurement of thermo-optic coefficients of transparent materials," Proc. SPIE 4016, Photonics, Devices, and Systems, (29 Dec. 1999); doi: 10.1117/12.373648).

Optionally, the electromagnetic radiation passes through the transformation layer only once. This can help in improving resolution of the device.

According to a second aspect the transformation layer includes a portion shielded from the electromagnetic radiation for generating a compensation signal from the portion. The shielded portion may be positioned at the location of the image plane. The shielded portion can e.g. be positioned at the image plane, outside the image of the object, e.g. next to the image, or surrounding the image. The cross-sectional dimension of the measurement beam can be such that 1) the entire image, or part thereof, of the object on the image plane is within the cross-sectional area, and 2) the shielded portion is within the cross-sectional area. The shielded portion is shielded from the electromagnetic radiation. Therefore, in the shielded portion no variation of the refractive index of the transformation layer due to the impinging electromagnetic radiation is to be expected, and thus no optical phase change due to impinging electromagnetic radiation. The shielded portion can be sampled by a compensation beam in the measurement arm. Any optical phase change detected in the shielded portion is likely due to environmental changes not attributable to the impinging electromagnetic radiation. Hence, optical phase determined in the shielded portion can be used as a compensation for correcting optical phase changes determined at the image of the object at the image plane.

This allows measurement by a probe beam in the measurement arm of a, e.g. phase-shift interferometer of temperature dependent optical phase differences in a, e.g. low-cost, detector material that includes two thermally connected sample volumes where the measurement volume is having its refractive index changed under exposure to an object beam of electromagnetic radiation and where the compensation volume is optically isolated from the object beam of electromagnetic radiation.

An auto-compensation can be made by a geometric setup of the interferometer in such a way that the geometric change of the sample length L with temperature is the same in the probe beam and in the compensation beam of the phase-shift interferometer.

The radiation source generating the probe beam and reference beam, and optionally compensation beam, can be, dependent on the type of interferometric setup, a coherent or a low-coherence radiation source.

It will be appreciated that it is also possible that part of the transformation layer, or an identical second transformation layer, is placed in the reference arm of the interferometer to provide the compensation.

According to a third aspect the transformation layer includes a solid, a liquid, a gas, or any combination thereof. Preferably, the transformation layer is optically transparent for the probe beam of the interferometer. Preferably a solid, liquid, gas, or combination thereof, is selected having a large thermo-optic coefficient $$\frac{dn}{dT}.$$

The thermo-optic coefficient $$\frac{dn}{dT}$$

determines the change of the refractive index of the transformation layer material for temperature change.

The selected detector material of the transformation layer optimizes the signal to noise ratio in the interferometer by providing a large optical path difference modulation as function of the 3D-spatial irradiance distribution in the detector material. The absorption of the electromagnetic energy causes local changes in the optical path difference of the auto-compensating phase-shift interferometer. The local optical path differences are converted after phase unwrapping ("Two-dimensional phase unwrapping, Theory, algorithms, and software", Dennis C. Ghiglia, Mark D. Pritt, ISBN 0-471-24935-1) in a continuous 2D-phase function. This unwrapped phase function is used to reconstruct the temperature distribution of the observed object.

Optionally, the transformation layer comprises a polymer. The transformation layer can e.g. consist of a polymer. The polymer can e.g. be a doped polymer. The polymers can have a high $$\frac{dn}{dT}.$$

Optionally, the transformation layer includes a liquid mixture, such as a water and glycol mixture, a solution containing carboxylic acid (RCOOH), alcohol (ROH), ester (RCOOR) and water ($H_2O$) or a liquid crystal, e.g. a synthetic liquid crystal.

Optionally, the transformation layer includes a colloidal suspension, such as suspended nanoparticles or magnetic fluids. The colloidal suspension can provide the advantage that the liquid can provide a high $$\frac{dn}{dT},$$

and the suspended particles can provide rapid heating of the liquid under the influence of irradiation with the electromagnetic radiation.

As an example, the following solids, liquids and polymers, have been identified for having a high thermo-optic coefficient $$\frac{dn}{dT}:$$

borosilicate glass $4.1 \times 10^{-6}$/K,
zinc silicate glass $5.5 \times 10^{-6}$/K,
silica glass $10.8 \times 10^{-6}$/K,
water $-0.91 \times 10^{-4}$/K,
poly(methyl-methacrylate) $-1.20 \times 10^{-4}$/K,
azopolymer of DR1/PMMA $-1.215 \times 10^{-4}$/K,
polystyrene $-1.23 \times 10^{-4}$/K,
DR1 polyimide $-1.331 \times 10^{-4}$/K,
glycerol $-2.3 \times 10^{-4}$/K,
polymethacrylate $-3.33 \times 10^{-4}$/K,
1-propanol $-3.9 \times 10^{-4}$/K,
methanol $-3.94 \times 10^{-4}$/K,
ethanol $-4 \times 10^{-4}$/K,
acetonitrile $-4.5 \times 10^{-4}$/K,
acetone $-5.42 \times 10^{-4}$/K,
tetrachloromethane $-6.12 \times 10^{-4}$/K,
carbon disulfide $-8.09 \times 10^{-4}$/K and
azo polyurethane $-9.12 \times 10^{-4}$/K.

Use of the above materials, or combinations thereof, in the transformation layer form preferred embodiments of the invention.

Azo polyurethane (Azo BPU 1) has a thermo-optic coefficient of $-1.4 \times 10^{-3}$/K at a wavelength of 1550 nm (Yan Jiang et al., Optical Materials 75 (2018) 858-868) where it can be used in a, e.g. phase-shift, interferometer setup based on a 1550 nm laser diode source and an InGaAs detector. By selecting a high thermo-optic coefficient like the one of azo polyurethane and the proper probe beam wavelength a highly sensitive device and method can be provided.

According to a fourth aspect, the transformation layer is housed between two windows. The transformation layer can e.g. be housed in a narrow space, e.g. 1 μm-100 μm wide between two windows. The two windows can be connected at a perimeter to form a cavity between the windows. The cavity can easily house the transformation layer in case it is a solid, liquid, gas, or mixture thereof. Typical cavity spaces for pure water have a thickness of x=12 μm based on a relaxation time $$\tau = \frac{x^2}{\chi}$$

where τ=1 ms and the thermal diffusivity of pure water is $\chi=1.48 \times 10^{-7}$ m²/s. A small relaxation time is preferential to obtain a fast response of the sensor. The small relaxation time also allows to use correlation techniques on the recorded images by the processing unit resulting in an increase of the signal to noise ratio in finally displayed image.

Optionally, the outer window, directed towards the source of the electromagnetic radiation, is transparent to the electromagnetic radiation. Optionally, the outer window is not transparent to the light used in the interferometer. The outer window can e.g. include Germanium, Zinc Selenide, Zinc Sulfide, Silicon, Calcium Fluoride and/or chalcogenide glasses that are typical thermal infrared window materials. Optionally, the outer window includes a first area transparent to the electromagnetic radiation, and a second area not transparent to the electromagnetic radiation. The second area can form the shielded portion.

Optionally, the outer window has at least one of its surfaces coated. The external surface of the outer window is typically coated with a high performing anti-reflection coating. The internal surface of the outer window can have a coating that is optimized for transmitting the external electromagnetic radiation and reflecting at the wavelength of the light used in the interferometer.

Optionally, the inner window, directed away from the source of the electromagnetic radiation, is transparent to the light used in the interferometer. Optionally, the inner window is not transparent to the electromagnetic radiation. Optionally, the inner window has its surfaces coated. The external surface of the inner window is typically coated with a high performing anti-reflection coating. The internal surface of the inner window can have a coating that is optimized for transmitting the light of the interferometer and reflecting at the wavelengths of the external electromagnetic radiation. The inner window can e.g. include Fused Silica or BK7 glass.

Optionally, the outer window and inner window are kept at different temperatures to create a temperature gradient that forces the heat wave being absorbed by the transformation layer, to propagate mainly along the optical axis of the interferometer. The temperature difference can be created by placing a transparent cold finger between the transformation layer and the inner surface of the inner window. Such a transparent cold finger could be a coating having a high thermal conductivity (e.g. diamond-like material having typically 900-2320 W $m^{-1}K^{-1}$). This cold finger can be connected to an external thermo-electric cooler (TEC). The outer and inner window can be equipped with temperature probes to allow control of the temperature gradient.

According to a fifth aspect, the interferometer is a phase-shifting interferometer (Optical Shop Testing, $3^{rd}$ Edition, Wiley-Interscience, Chapter 14). The phase-shifting interferometer provides the advantage that accurate measurement of the spatiotemporal phase difference is possible.

Optionally, the radiation source of the interferometer is a current modulated laser diode (Hisao Kikuta, Koichi Iwata, Ryo Nagata, Distance measurement by the wavelength shift laser diode light, Applied Optics Vol. 25, No. 17, 1 Sep. 1986). Optionally, the, e.g. current modulated, laser diode is synchronized with the digital camera.

According to a sixth aspect, the device includes a digital camera arranged for capturing an interference image generated by the interferometer.

Optionally, the device includes a processing unit arranged for processing the camera signal of the digital camera, such as for display on a display device.

According to a seventh aspect is provided a thermal camera including a device as described hereinabove.

According to an eight aspect is provided a multi-spectral camera including a device as described hereinabove.

According to a ninth aspect is provided a night vision camera including a device as described hereinabove.

According to a tenth aspect is provided an add-on device for a mobile device, such as a smartphone or tablet, including a device as described hereinabove, arranged for cooperating with the mobile device, such that a digital camera of the mobile device captures an interference image generated by the interferometer. The add-on device can e.g. be a clip-on device. The add-on device can e.g. be included in, such as integrated in, a cover for the mobile device.

According to an eleventh aspect is provided a method for imaging, e.g. invisible, electromagnetic radiation from an object. The method includes imaging, e.g. by entrance optics, an electromagnetic radiation image of the object on an image plane of the entrance optics, wherein the image plane is in the detection arm of an interferometer. The method includes transforming, by a transformation layer at the image plane, the electromagnetic radiation into a spatiotemporal variation of the refractive index of the transformation layer for causing spatiotemporal optical phase differences in the measurement arm of the interferometer representative of the image of the object. The method includes generating a visible image representative of the image of the object based on phase unwrapped optical phase differences.

Optionally, the method includes generating, in the interferometer, e.g. at the location of the image plane, a compensation signal by shielding a portion of the transformation layer from the electromagnetic radiation.

Optionally, the method includes generating a plurality of visible images wherein a phase of the illumination light of the interferometer differs between individual images of the plurality of visible images; and generating a single visible image based on the plurality of visible images.

According to a twelfth aspect is provided a computer program product including software code portions arranged for, when executed on a programmable apparatus, generating a visible image, on the basis of an interference image generated by the interferometer of the device as described hereinabove, the camera as described hereinabove, or the add-on device as described hereinabove. The computer program product can e.g. be an application, also referred to as app, installable and executable on the mobile device. Hence, a general-purpose mobile device can easily be converted into an imaging device for, e.g. invisible, electromagnetic radiation, such as a thermal imaging device or infrared imaging device.

An application of the devices, cameras and method is the detection of infrared radiation in the wavelength region from 0.7 micron (430 THz) to 1000 micron (300 GHz). In that spectrum one finds the spectral bands of near-infrared radiation (NIR), short-wave infrared radiation (SWIR), mi-wave infrared radiation (MWIR), long-wave infrared radiation (LWIR) and very-long wave infrared radiation (VLWIR). Uncooled operation could be considered up to wavelengths of 30 micron. A multispectral detector can be created by an adequate mixture of absorbing materials having a high $$\frac{dn}{dT}.$$

The present invention can allow low-cost high resolution multi-spectral large format thermal infrared detectors to be manufactured with a short manufacturing production cycle time. The opto-mechanical complexity of the present invention is similar to the opto-mechanics of a CDROM optical head that has been mass produced at low cost. The major markets for this detector are the defense, the security and the automotive industry as well as the new market of consumer applications and energy-housekeeping markets.

It will be appreciated that any one or more of the above aspects, features and options can be combined. It will be appreciated that any one of the options described in view of one of the aspects can be applied equally to any of the other aspects. It will also be clear that all aspects, features and options described in view of the devices apply equally to the cameras and method, and vice versa.

BRIEF DESCRIPTION OF THE DRAWING

The invention will further be elucidated based on exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
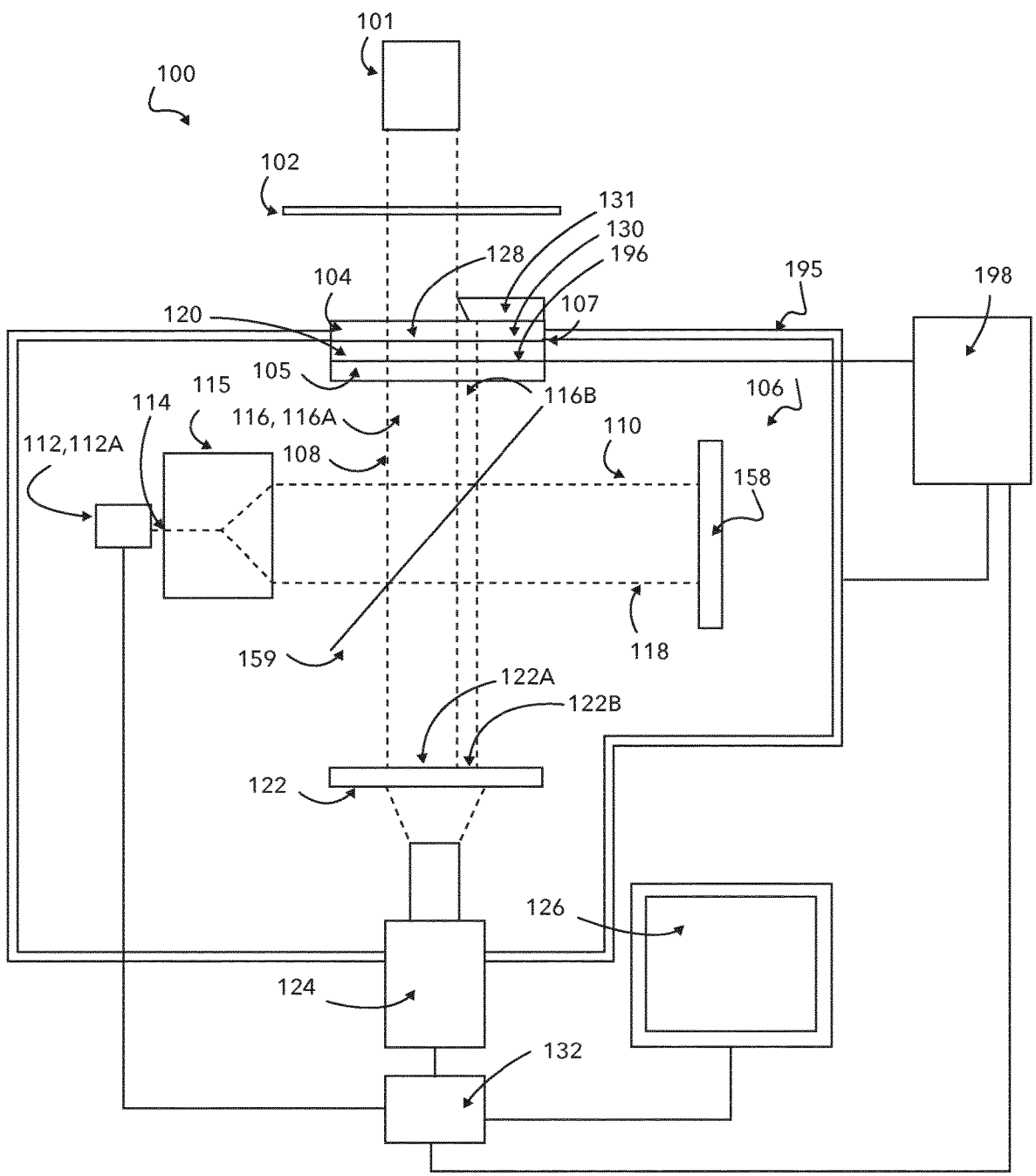
FIG. 1 shows a schematic example of a device.

FIG. 1 shows a schematic representation of an example of a device 100. The device is arranged for imaging electromagnetic radiation from an object 101. The electromagnetic radiation is preferably invisible radiation, such as near-infrared radiation (NIR), short-wave infrared radiation (SWIR), medium-wave infrared radiation (MWIR), long-wave infrared radiation (LWIR), very long-wave infrared radiation (VLWIR), millimeter wavelength radiation, and/or microwave wavelength radiation.

The device 100 includes entrance optics. In this example, the entrance optics includes an objective 102. In this example, the entrance optics includes an entrance window 104. The entrance window 104 allows the electromagnetic radiation to enter the device 100. The objective 102 can include classical and/or diffractive optical elements. The entrance optics includes an image plane, or focal plane, 107 onto which the object is to be imaged. The objective 102 can include refractive, reflective, cata-dioptric and/or diffractive optical elements for focusing the object 101 at the image plane 107. The device 100 includes an interferometer 106. Here, the interferometer 106 has a beam-splitter 159 and a reference mirror 158. The interferometer 106 has a measurement arm 108. The interferometer 106 in this example also has a reference arm 110. The interferometer 106 includes a light source 112. The light source 112 generates a coherent beam 114 of light. The light source can e.g. be a laser diode. The light source can include a collimator/beam expander 115 for expanding a cross-sectional dimension of the beam. In this example the beam of light 114 is split into a first beam 116, travelling along the measurement arm 108, and a second beam 118, travelling along the reference arm 110. It will be appreciated that the image plane 107 is in the measurement arm 108

The device 100 further includes a transformation layer 120 at the image plane 107. The transformation layer includes a material having a high $$\frac{dn}{dT}.$$

Here, the image plane 107 is positioned at a back plane of the window 104, i.e. at a front plane of the transformation layer 120, or the image plane is positioned adjacent the window 104 in the transformation layer 120.

When the image of the object 101 is focused onto the transformation layer 120 at the image plane 107, the transformation layer will experience local heating as a function of the intensity of the radiation in the image. The high $$\frac{dn}{dT}$$

of the transformation layer 120 causes transformation of the local intensity of the electromagnetic radiation in the image into a local variation of the refractive index of the transformation layer 120. The first beam 116 will be affected by the local changes in refractive index. The second beam 118 is shielded from the electromagnetic radiation, and thus remains unaffected. When recombined, the first beam 116 and the second beam 118 cause an interference pattern at detection plane 122 of the interferometer. It will be appreciated that the interference pattern will include local interferences across the cross-sectional area of the combined beam. The local interferences are representative of the image of the electromagnetic radiation at the image plane 107. A cold finger 196 is placed at the interface between the transformation layer 120 and the window 105. The cold finger 196 can create a temperature difference between the window 104 and the window 105. The cold finger 196 is connected to an external thermo-electric cooler 198. In this example, the device 100 includes a detector 124, such as a digital video camera, e.g. a CMOS camera, for capturing an image of the interference pattern at the detection plane 122. As a result, the device 100 can convert an image in invisible electromagnetic radiation at the image plane 107 into a visible image at the detection plane 122, or at a display device 126 coupled to the detector 124.

In this example, the transformation layer 120 includes a first area 128 where the object is imaged, and a second area 130, which is shielded from the electromagnetic radiation, e.g. using a cover 131. The cover 131 could be fixed or moveable. When it is moveable it can cover the first area 128 and the second area 130 such that the external electromagnetic radiation is blocked. The cover 131 could be used as a mechanical chopper allowing phase sensitive detection. The first beam 116 includes two portions. A probe beam portion 116A samples the first area. A compensation beam portion 116B samples the second area 130. This generates two portions in the image at the detection plane 122. The first area 122A corresponds to the probe beam 116A, the second area 122B corresponds to the compensation beam 116B. It will be appreciated that since the compensation beam samples the second area, shielded from the electromagnetic radiation, the compensation beam is not affected by the electromagnetic radiation. Nevertheless, the compensation beam can be affected by environmental factors, such as temperature, humidity, and the like. Therefore, the compensation beam 116B can be used for generating a compensation signal to be used for compensating the probe signal for such environmental factors. In this example, the device 100 includes a processor 132 arranged for automatically compensating the image of the first area 122A of the image on the detection plane 122 recorded by the detector using a signal, such as an average intensity, of the interferometer signal in the second area 122B on the detection plane 122.

In this example, the light source 112 includes a modulator 112A for modulating the optical phase of the light source. This allows to take consecutive readings, such as images, with the detector at mutually different optical phases of the light source 112. This is also known as phase shift interferometry. The critical parts of the setup can be placed in a vacuum chamber 195. The vacuum chamber 195 can be controlled in temperature through the thermo-electric cooler 198.

The transformation layer can be a solid, a liquid, a gas, or a combination thereof, e.g. a polymer or a colloidal suspension. The transformation layer can be housed between two windows. The transformation layer can e.g. be housed in a narrow space, e.g. 1 μm-100 μm wide between two windows. The two windows can be connected at a perimeter to form a cavity between the windows. The cavity can easily house the transformation layer in case it is a liquid, gas, or mixture thereof. An outer one of the two windows can e.g. form an entrance window of the device.

A balanced setup is used where one volume in the transformation layer is illuminated with radiation from the object and another volume is not illuminated by the radiation from the object. Both volumes are simultaneously illuminated by the first beam. Interferometric data from both volumes are used to detect the difference in refractive index and by doing so infer the temperature distribution of the object based on the equation:

$$d\ n(x, y, z;\ t) = \frac{\partial n(x, y, z;\ t)}{\partial T} d\ T(x, y, z;\ t)$$

The reconstruction of the temperature distribution in the image of the object allows visualization of the temperature distribution of the object. The interferometric data can be collected for example using a phase detection in a Michelson interferometer, in a Fizeau interferometer, in a Twyman-Green interferometer, in a Mach-Zehnder interferometer, in a Fabry-Perot interferometer, in a lateral shearing interferometer, in a Jamin interferometer, phase detection in a Doppler-based sensing or a resonator-based sensing. In all these examples of interferometric setups, that are a non-exhaustive list, the change in the interferometric data is being induced by local temperature changes in the detection volume. In these interferograms the interference order $\Delta m(x, y)$ relates to the wavelength of the probe beam $\lambda$, the path length of the light in the sample L and the change in refractive index $\Delta n(x, y)$ according to the equation:

$$\Delta m(x, y) = \frac{L}{\lambda} \Delta n(x, y) \quad (5)$$

When the transformation layer is homogeneous, the optical path of the measurement arm through the transformation layer is equal for all positions (x, y). In such a case the fringes in the interferogram are straight and the number and their angle with respect to an arbitrary axis are e.g. determined by the tilt in a tilt mirror in the other, reference, interferometer arm. Thus, the fringes are equidistant and for a given y the interference order $k(x, y_0)$ is a periodic function. Solving the equation for the refractive index $n(x, y, z)$ gives the equation:

$$n^2(x, y, z) = \frac{2K\rho(x, y, z) + 1}{1 - K\rho(x, y, z)} \quad (6)$$

The optical path length OPL is based on Fermat's principle and is defined by the line integral along the path from A to B:

$$\text{OPL} = \int_A^B n(s) ds \quad (7)$$

where s is the parameter along the light path.
One can obtain the equation:

$$\Psi(x, y;\ t) = \frac{4\pi}{\lambda} \int_{path} \Delta n(x, y, z;\ t) ds,$$

where $\Psi(x, y; t)$ is the variable phase in the interferogram at time t and z is the coordinate along the optical axis of the interferometer while (x,y) are the coordinates in the transverse direction to the optical axis of the interferometer. An interferogram has typically an irradiance I(x,y; t) given by the equation:

$$I(x,y;t) = I_1 + I_2 + 2\sqrt{I_1 I_2} \cos[(\varphi_A - \varphi_B) - \Psi(x,y;t)],$$

where $I_1$ is the irradiance in the reference arm and $I_2$ is the irradiance in the measurement arm. In an example, phase shifting interferometry (PSI) is used to improve the accuracy of the phase measurement. For this purpose, many algorithms have been described (see Optical Shop Testing, Daniel Malacara, 3rd Edition). A classical algorithm is the four-step PSI. In this algorithm four interferograms are captured $I_1(x, y)$, $I_2(x, y)$, $I_3(x, y)$ and $I_4(x, y)$ with respective phase shifts of 0, $\pi/2$, $\pi$ and $3\pi/2$, where (x, y) is measured in the transverse plane to the propagation of the probe beam. The spatial distribution of the wrapped phase $\Psi(x, y)$ is retrieved through the equation:

$$\psi(x, y) = \arctan\left(\frac{I_4(x, y) - I_2(x, y)}{I_1(x, y) - I_3(x, y)}\right) \quad (8)$$

In the case of the Hariharan algorithm there are 5 interferograms resulting for the wrapped phase $\psi(x,y)$ in the equation:

$$\psi(x, y) = \arctan\left(\frac{2(I_2(x, y) - I_4(x, y))}{(2I_3(x, y) - I_5(x, y) - I_1(x, y))}\right)$$

It is known that the Hariharan algorithm is more robust than the four-step algorithm.

The processor 132 can be arranged for performing the calculations required for the phase shifting interferometry. The light source being a current modulated laser diode 112 can be synchronized with the detector being a digital camera 124 for phase shifting interferometry.

The phase-shifter can be of different kinds, for example the current of a laser diode of the probe beam can be modulated. Other phase-shifters based on the polarization of the radiation of the probe beam can be used, for example, using linear polarized light where the polarization is rotated by wave plates such that the obtained phase shift is 90 degrees. The relation of the effective refractive index $n_{eff}(x, y)$ and the measured spatial distribution of the phase $\varphi(x, y)$ is given by the equation:

$$\varphi(x,y) = n_{eff}(x,y)kL, \qquad (9)$$

where $$k = \frac{2\pi}{\lambda_0}$$

is the magnitude of the wave vector of the probe beam, $\lambda_0$ is the vacuum wavelength of the probe beam and L is the thickness in the z-direction of the transformation layer 120. Because of the periodic characteristics of the interfering waves, the wrapped phase at a certain point $\varphi(x, y)$ is uniquely defined only in the principal value range of $(-\pi, \pi]$. Therefore phase-unwrapping algorithms can be used to generate a continuous phase $\varphi(x, y)$ where the relation with the wrapped phase is:

$$\varphi(x, y) = \psi(x, y) - 2\pi \left[ \frac{\psi(x, y)}{2\pi} \right] \qquad (10)$$

where the symbol [x] means the nearest integer function of x.

Figure 7:
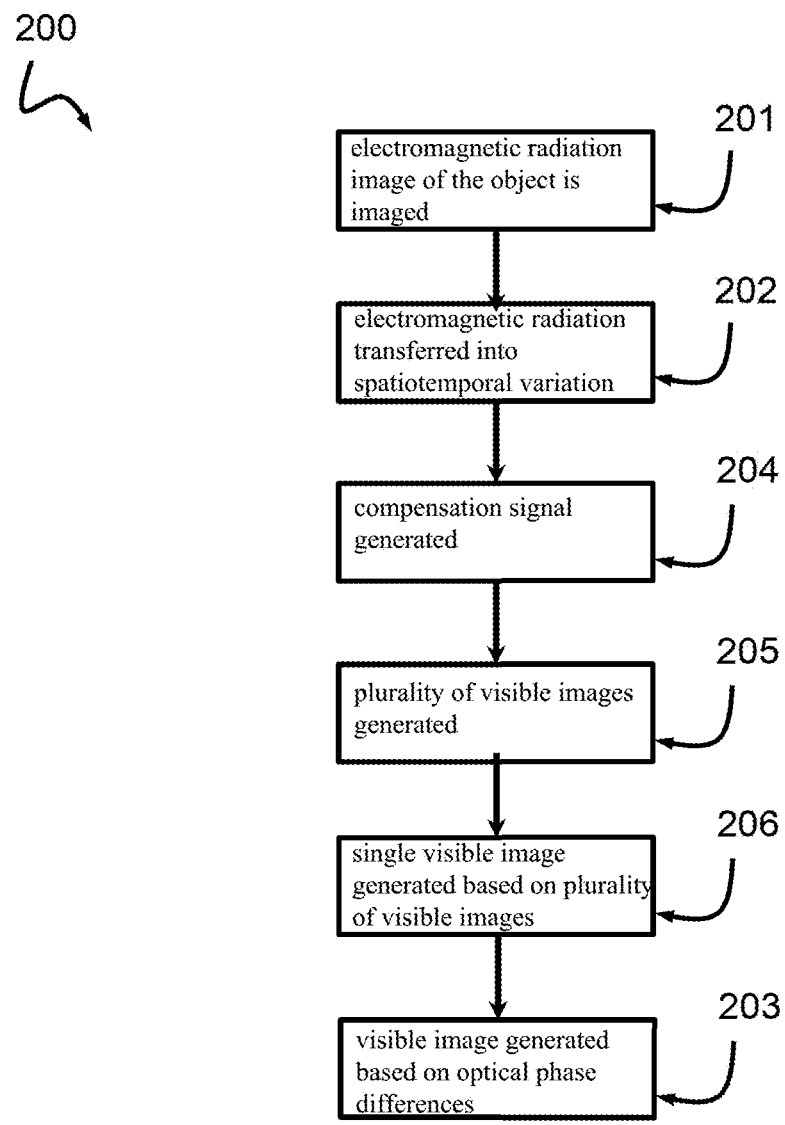
FIG. 7 shows a schematic representation of a method.

As shown in FIG. 7, the device as described with reference to FIG. 1 can be used in a method 200 for imaging, e.g. invisible, electromagnetic radiation from an object as follows. In a step 201 an electromagnetic radiation image of the object is imaged on an image plane, wherein the image plane is in the detection arm of an interferometer. In a step 202 the electromagnetic radiation is transformed into a spatiotemporal variation of the refractive index of a transformation layer at the image plane for causing spatiotemporal optical phase differences in the measurement arm of the interferometer representative of the image of the object. In a step 203 a visible image is generated representative of the image of the object based on the optical phase differences.

Optionally in a step 204 in the interferometer measurement arm, at the location of the image plane, a compensation signal is generated by shielding a portion of the measurement arm from the electromagnetic radiation. Optionally in a step 205 a plurality of visible images is generated wherein a phase of the illumination light of the interferometer differs between individual images of the plurality of visible images, and in an optional step 206 a single visible image is generated based on the plurality of visible images.

Figure 2:
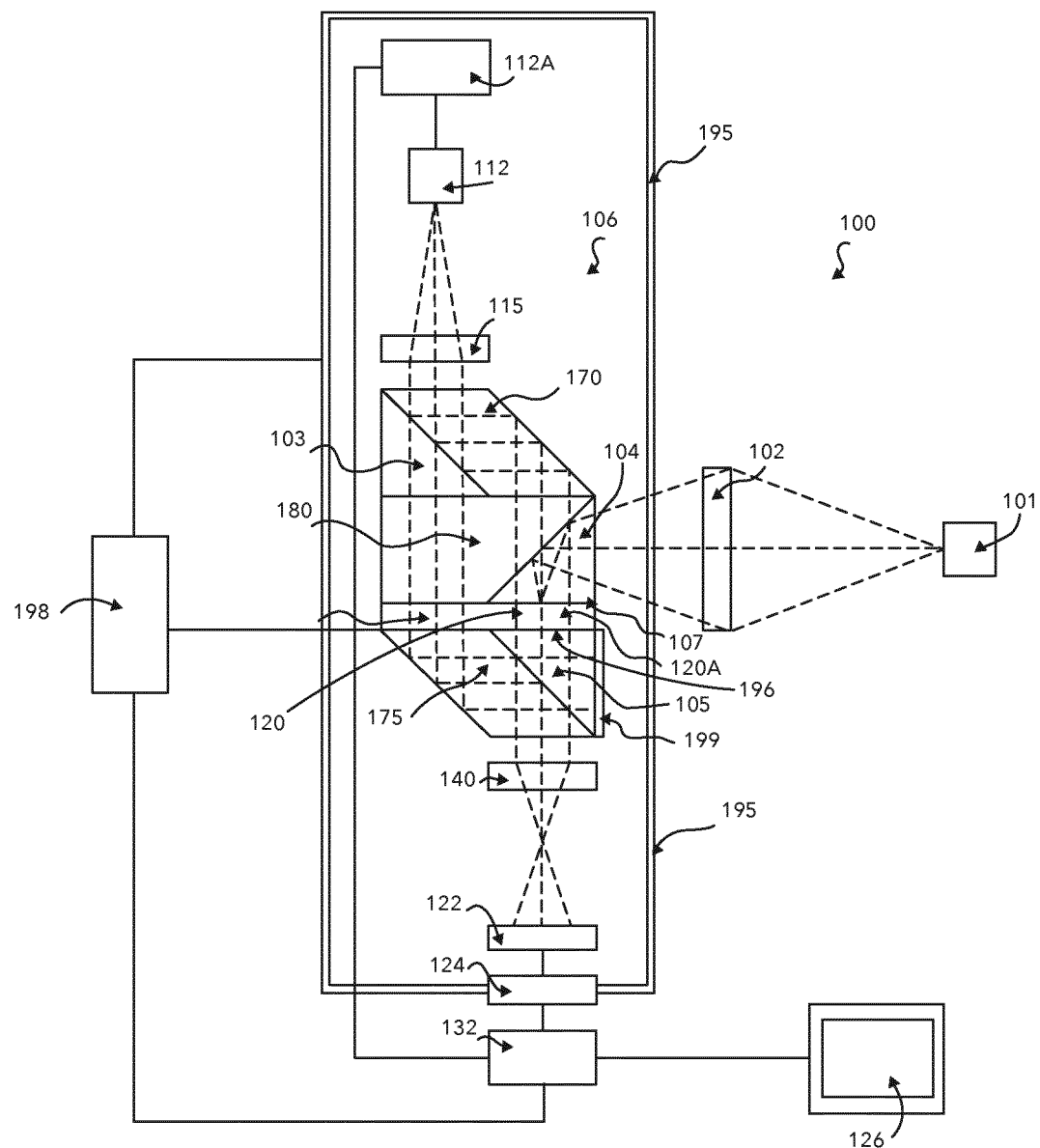
FIG. 2 shows a schematic example of a device using a Mach-Zehnder interferometric setup.

The arrangement in FIG. 2 shows an exemplary arrangement of a device. The probe beam is passing only once through the transformation layer. FIG. 2 shows an object 101 emitting electro-magnetic radiation that is collected by an objective 102 that creates an image in the image plane 107. In doing so the electro-magnetic radiation is reflected specularly at an interface between a beam splitter rhombohedron 190 and an entrance prism window 104. The image plane 107 is embedded in the transformation layer 120. A cold finger 196 is placed at the interface between the transformation layer 120 and the output prism window 105. The image is formed in a measurement volume of the transformation layer 120. The transformation layer 120 is placed between the entrance prism window 104 and an output prism window 105. The radiation of the light source, here a laser diode, 112 operates as probe beam where a collimator 115 collects the radiation of the laser diode 112 such that it illuminates the transformation layer with, at least quasi, parallel radiation. The collimated radiation of the laser diode 112 is split by a first beam splitter rhombohedron 170 and a prism beam splitter 103 in two beams. One beam propagates through a second beam splitter rhombohedron 180 towards the entrance prism 104 and continues to the transformation layer 120A and the other beam propagates through the compensation arm of the Mach-Zehnder interferometer 106 along the second beam splitter rhombohedron towards the compensation volume 120B and continues such that it reflects specularly on the surfaces of a third beam splitter rhombohedron 175. The beam of the measurement arm and the reference arm are combined at the interface between the output prism window 105 and the third beam splitter rhombohedron 175. A light absorbing material 199 can be glued to the output prism 105 to suppress parasitic light. The combined beam passes through an objective 140 that creates an image of the interface between the entrance prism window 104 and the transformation layer 120 on a detector, here a, for example CMOS, imager 124. The signal of the imager 124 is processed by a processing unit 132 and subsequently visualized on a display 126. The processing unit 132 and a laser diode driver 112A are synchronized by an internal clock. The critical parts of the setup can be placed in a vacuum chamber 195. The vacuum chamber 195 can be controlled in temperature through the thermo-electric cooler 198. The signals of the thermo-electric cooler 198 are controlled by the processing unit 132.

Figure 3:
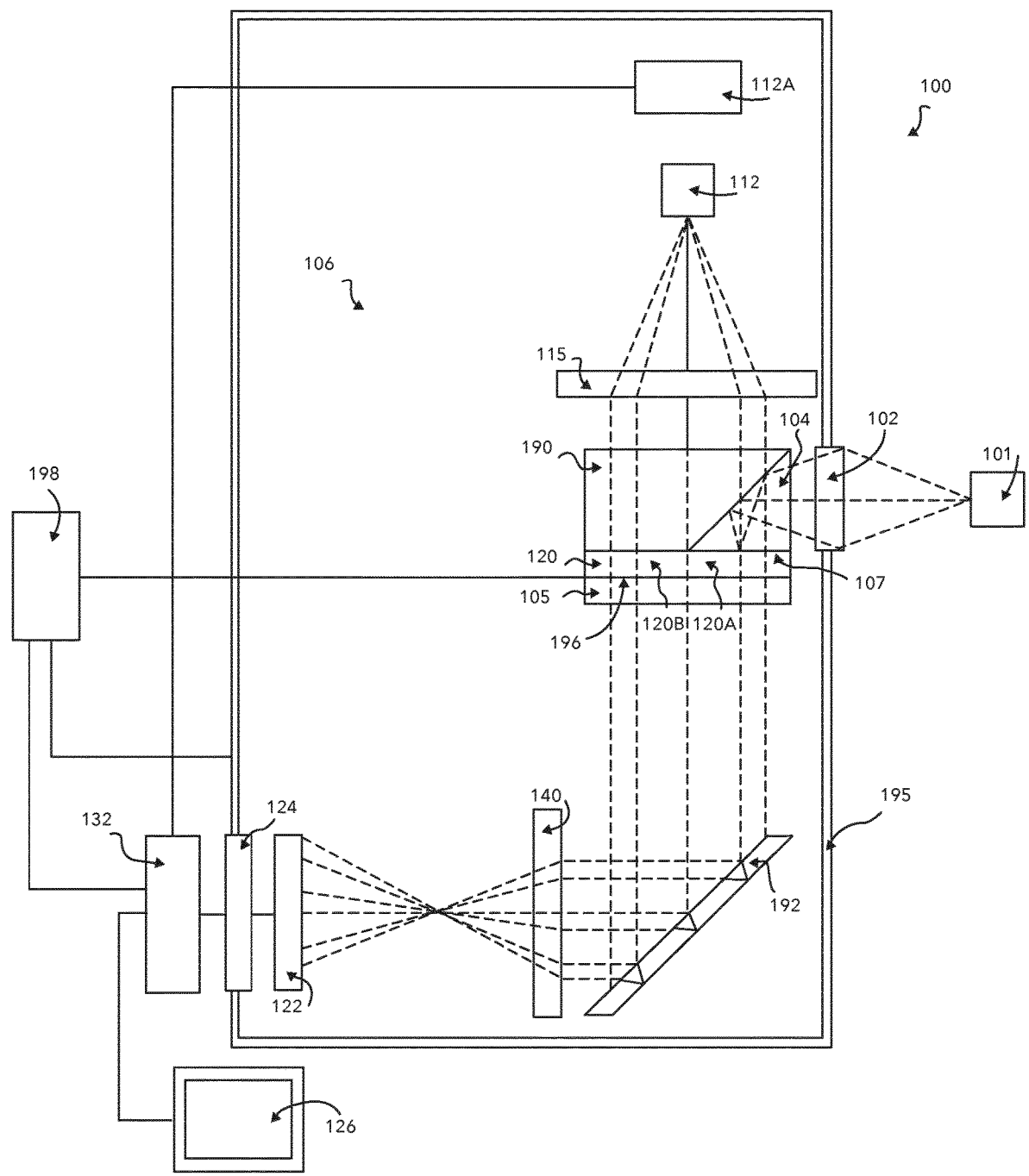
FIG. 3 shows a schematic example of a device using a lateral shearing interferometric setup.

The arrangement in FIG. 3 shows an exemplary arrangement of a device. The probe beam is passing only once through the transformation layer 120. FIG. 3 shows an object 101 emitting electro-magnetic radiation that is collected by an objective 102 that creates an image in the image plane 107. In doing so the electromagnetic radiation is reflected specularly at the interface between a beam splitter rhombohedron 190 and an entrance prism window 104. The image plane 107 is embedded in the transformation layer 120. A cold finger 196 is placed at the interface between the transformation layer 120 and the output window 105. The image is formed in a measurement volume of the transformation layer 120. The transformation layer 120 is placed between an entrance prism window 104 and an output window 105. The radiation of a light source, here laser diode, 112 operates as probe beam where a collimator 115 collects the radiation of the laser diode 112 such that it illuminates the transformation layer 120 with, at least quasi, parallel radiation. The transformation layer 120 in this example contains two volumes: one measurement volume 120A and one compensation volume 120B. Both volumes are initially at the same temperature. The collimated radiation of the laser diode 112 is reflected specularly at a parallel plate 192 in two beams. One beam is formed by the reflection at the front surface of the parallel plate 192 and another beam is formed at the back surface of the parallel plate 192. The specularly reflected beams are sheared laterally with respect to each other and result in a lateral shearing interferometer 106. Both beams pass through the objective 140 that creates two sheared images of the interface between the entrance prism window 104 and the transformation layer

120 on the, for example CMOS, imager 124. In the overlap region of the two beams an interference pattern is observed. This interference pattern is sensed at the imager 124 and is subsequently processed by the processing unit 132. The processing unit 132 transfers the data to be visualized to a display 126. The processing unit 132 and laser diode driver 112A are synchronized by an internal clock. The critical parts of the setup can be placed in a vacuum chamber 195. The vacuum chamber 195 can be controlled in temperature through the thermo-electric cooler 198. The signals of the thermo-electric cooler 198 are controlled by the processing unit 132.

Figure 4:
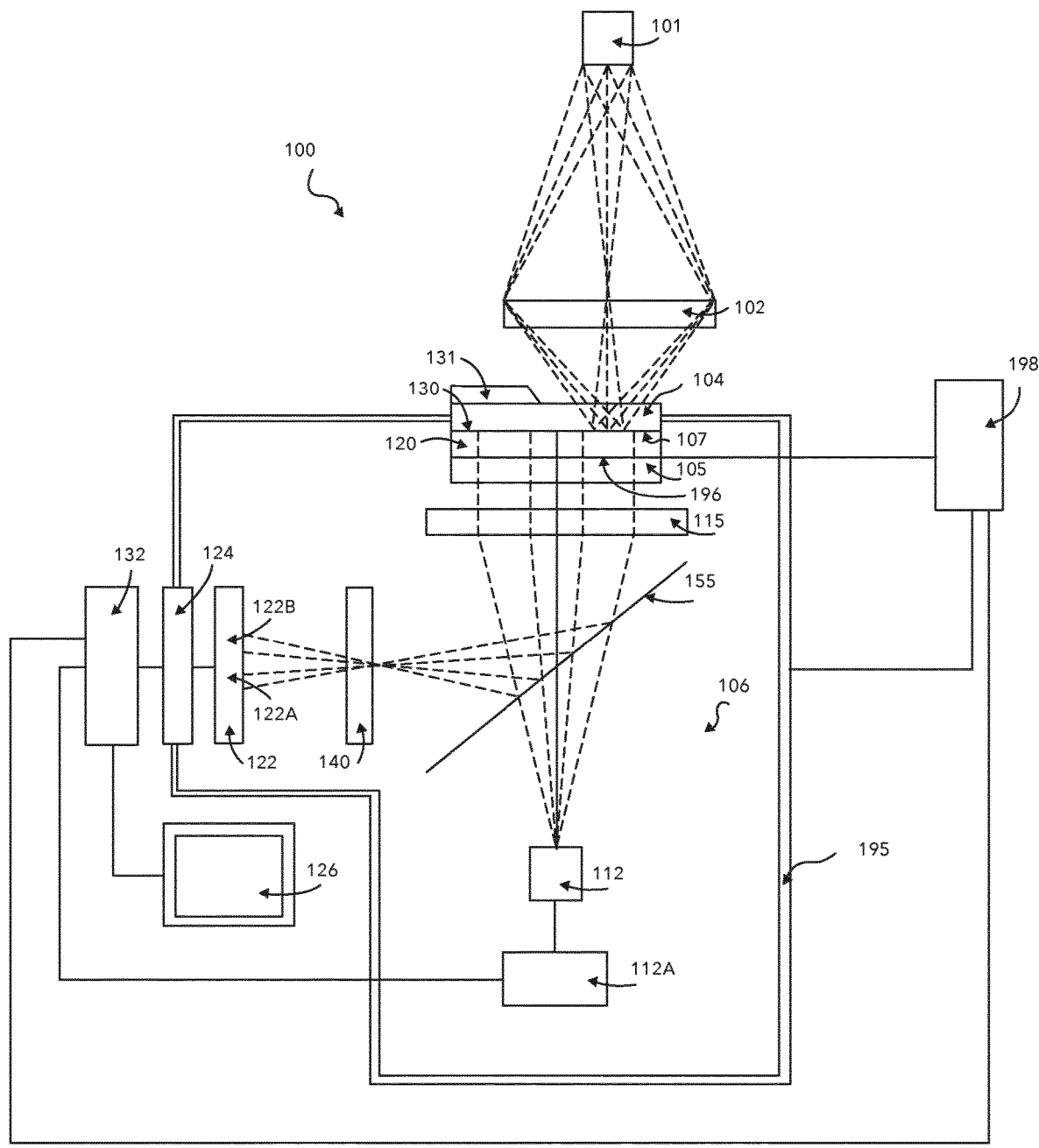
FIG. 4 shows a schematic example of a device using a Fizeau interferometric setup.

The arrangement in FIG. 4 shows an exemplary arrangement of a device. The probe beam is passing twice through the transformation layer 120. FIG. 4 shows an object 101 emitting electro-magnetic radiation that is collected by an objective 102 that creates an image in the image plane 107. The image plane 107 is embedded in the transformation layer 120. A cold finger 196 is placed at the interface between the transformation layer 120 and the window 105. The image is formed in a measurement volume of the transformation layer 120. The transformation layer 120 is placed between an entrance window 104 and an output window 105. A cover 131 is placed in front of the entrance window 104 to prevent electromagnetic radiation to reach the compensation volume of the transformation layer 120. The cover 131 could be fixed or moveable. When it is moveable it will cover the first area 128 and the second area 130 such that the external electromagnetic radiation is blocked. The cover 131 could be used as a mechanical chopper allowing phase sensitive detection. The radiation of a laser diode 112 operates as probe beam where a collimator 115 collects the radiation of the laser diode 112 such that it illuminates the transformation layer 120 with, at least quasi, parallel radiation. The collimated radiation of the laser diode 112 is reflected specularly at the interface between the transformation layer 120 and the entrance window 104. The specularly reflected radiation is diverted by a beam splitter 155 towards an objective 140 that creates an image of the interface between the entrance window 104 and the transformation layer 120 on the, for example CMOS, imager 124. The setup is recognized as Fizeau interferometer 106. The signal of the imager 124 is processed by the processing unit 132 and subsequently visualized on a display 126. The processing unit 132 and laser diode driver 112A are synchronized by an internal clock. The critical parts of the setup can be placed in a vacuum chamber 195. The vacuum chamber 195 can be controlled in temperature through the thermo-electric cooler 198. The signals of the thermo-electric cooler 198 are controlled by the processing unit 132.

Figure 5:
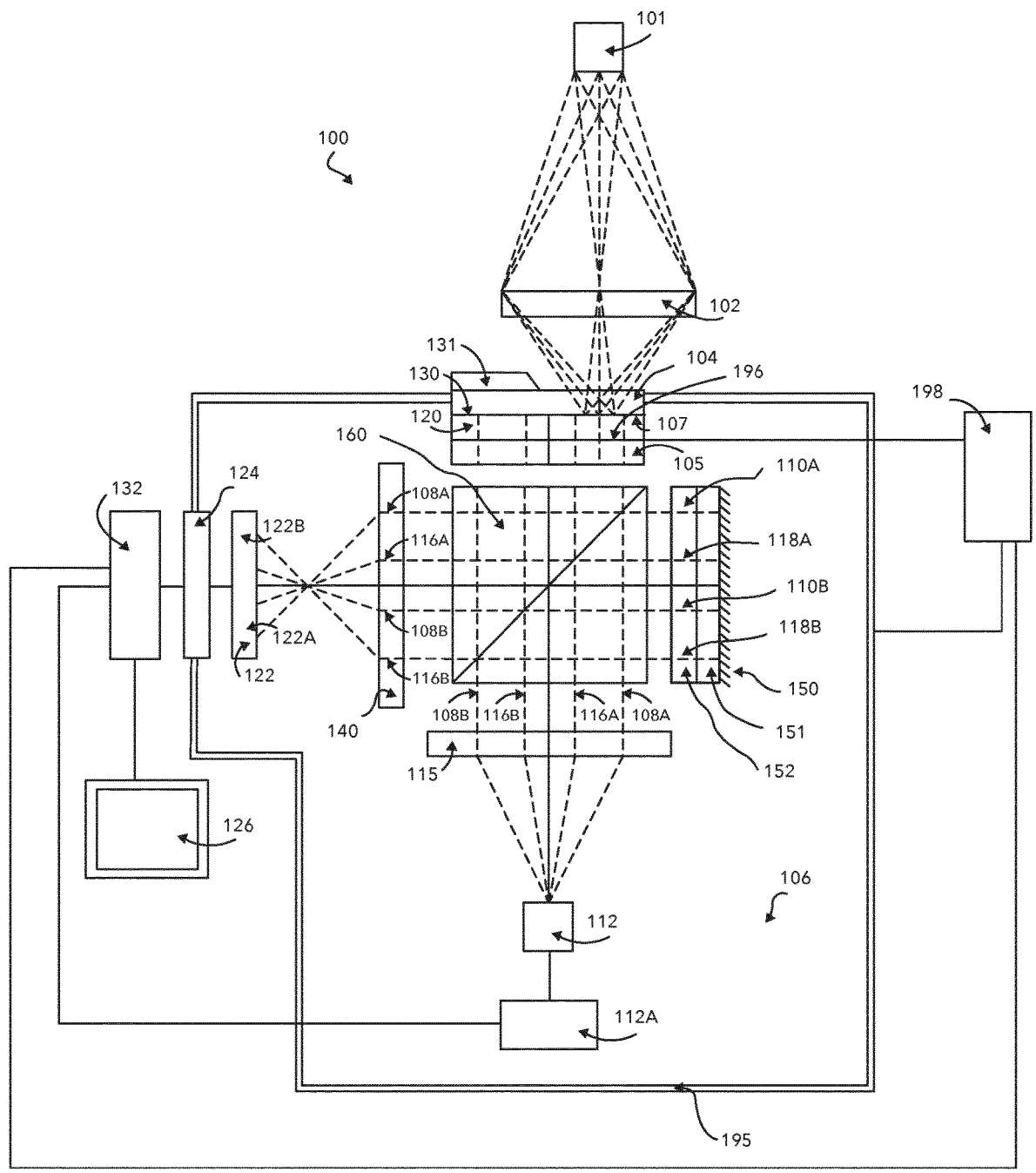
FIG. 5 shows a schematic example of a device using a Twyman-Green interferometric setup.

The arrangement in FIG. 5 shows an exemplary arrangement of a device. The probe beam is passing twice through the transformation layer. FIG. 5 shows an object 101 emitting electro-magnetic radiation that is collected by an objective 102 that creates an image in the image plane 107. The image plane 107 is embedded in the transformation layer 120. A cold finger 196 is placed at the interface between the transformation layer 120 and the output window 105. The image is formed in a measurement volume of the transformation layer 120. The transformation layer 120 is placed between an entrance window 104 and an output window 105. A cover 131 is placed in front of the entrance window 104 to prevent electromagnetic radiation to reach the compensation volume of the transformation layer 120. The cover 131 could be fixed or moveable. When it is moveable it will cover the first area 128 and the second area 130 such that the external electromagnetic radiation is blocked. The cover 131 could be used as a mechanical chopper allowing phase sensitive detection. The radiation of a light source, here laser diode, 112 operates as probe beam where a collimator 115 collects the radiation of the laser diode 112 such that it illuminates the transformation layer 120 with, at least quasi, parallel radiation. The collimated radiation of the laser diode 112 is split by the beam splitter cube 160 in two beams. One propagates to the transformation layer 120 and one propagates to the mirrored face 150 of the beam splitter cube 160. In the reference arm of the non-polarizing interferometer we find the optical equivalent of the output window 152, the optical equivalent of the transformation layer 151. Those optical equivalents can create an equal path interferometer instead of the nominal unequal path interferometer where the optical equivalents 152 and 151 are not present and where the mirror 150 is evaporated on one of the faces of the beam splitter cube 160. The specularly reflected beam at the interface between the transformation layer 120 and the entrance window 104 is again divided by the beam splitter cube 160 where one beam is diverted towards an objective 140 that creates an image of the interface between the entrance window 104 and the transformation layer 120 on the, for example CMOS, imager 124. The signal of the imager 124 is processed by the processing unit 132 and subsequently visualized on a display 126. The processing unit 132 and laser diode driver 122A are synchronized by an internal clock. The critical parts of the setup can be placed in a vacuum chamber 195. The vacuum chamber 195 can be controlled in temperature through the thermo-electric cooler 198. The signals of the thermo-electric cooler 198 are controlled by the processing unit 132.

Figure 6:
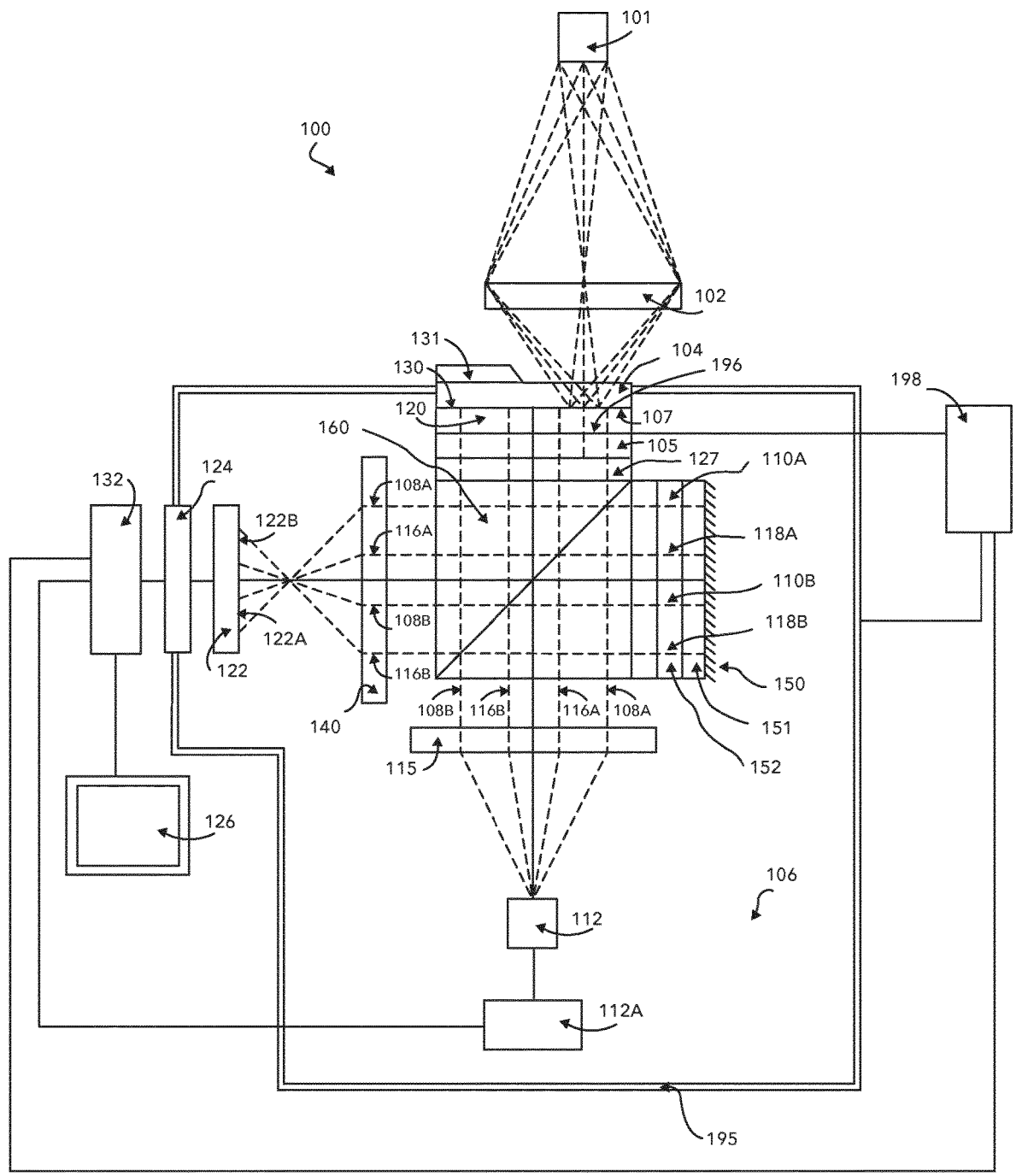
FIG. 6 shows a schematic example of a device using a polarizing Twyman-Green interferometric setup.

The arrangement in FIG. 6 shows exemplary arrangement of a device. The probe beam is passing twice through the transformation layer 120. FIG. 6 shows an object 101 emitting electro-magnetic radiation that is collected by an objective 102 that creates an image in the image plane 107. The image plane 107 is embedded in the transformation layer 120. A cold finger 196 is placed at the interface between the transformation layer 120 and the output window 105. The image is formed in a measurement volume of the transformation layer 120. The transformation layer 120 is placed between an entrance window 104 and an output window 105. A cover 131 is placed in front of the entrance window 104 to prevent electromagnetic radiation to reach the compensation volume of the transformation layer 120. The cover 131 could be fixed or moveable. When it is moveable it will cover the first area 128 and the second area 130 such that the external electromagnetic radiation is blocked. The cover 131 could be used as a mechanical chopper allowing phase sensitive detection. The radiation of a light source, here laser diode, 112 operates as probe beam where a collimator 115 collects the radiation of the laser diode 112 such that it illuminates the transformation layer 120 with, at least quasi, parallel radiation. The collimated radiation of the laser diode 112 is split by the polarizing beam splitter cube 161 in two beams. One propagates through a quarter wave plate 127 towards the transformation layer 120 and one propagates to the mirrored face 150 of the polarizing beam splitter cube 161. In the reference arm of the polarizing interferometer we find the optical equivalent of the quarter wave plate 153, the optical equivalent of the output window 152, the optical equivalent of the transformation layer 151. Those optical equivalents can create an equal path interferometer instead of the nominal unequal path interferometer where the optical equivalents 153, 152 and 151 are not present and where the mirror 150 is evaporated on one of the faces of the polarizing beam splitter cube 161. The specularly reflected beam at the interface between the transformation layer 120 and the entrance window 104 passes for a second time through the quarter wave plate 127 and is again divided by the polarizing beam splitter cube 161 where one beam is diverted towards a CMOS objective 140 that creates an image of the interface between the entrance prism window 104 and the transformation layer 120 on the, for example CMOS, imager 124. The signal of the imager 124 is processed by the processing unit 132 and subsequently visualized on a display 126. The processing unit 132 and laser diode driver 122A are synchronized by an internal clock. The setup is recognized as a Twyman-Green interferometer 106. The critical parts of the setup can be placed in a vacuum chamber 195. The vacuum chamber 195 can be controlled in temperature through the thermo-electric cooler 198. The signals of the thermo-electric cooler 198 are controlled by the processing unit 132.

Figure 8:
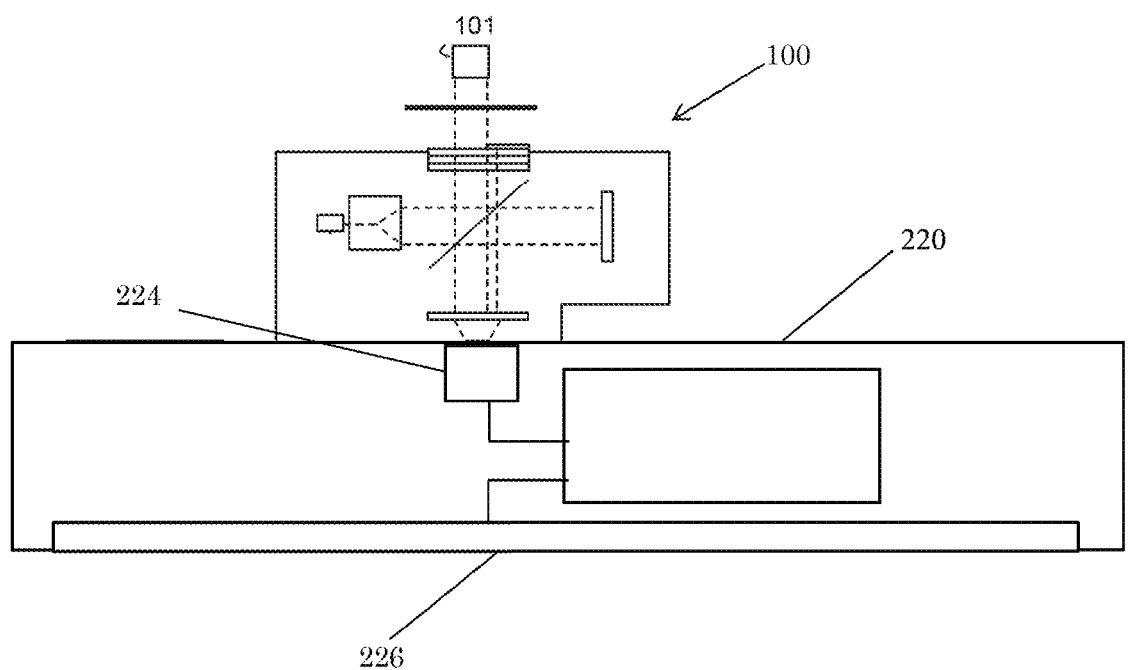
FIG. 8 shows a schematic representation of an add-on device for a mobile device.

FIG. 8 shows an example of a device 100 arranged as an add-on device for a mobile device 220, in this example a smartphone. In this example the add-on device is a clip-on device. It is also possible that the add-on device is otherwise mounted to the mobile device, e.g. through an adhesive connection. It will be appreciated that it is also possible that the add-on device is part of, or included by, a cover for the mobile device 220. In this example, the imager is formed by a digital camera 224 of the mobile device 220. Thus, the digital camera 224 can image the interference image created by the interferometer. The digital camera 224 is processed by the processing unit 232 of the mobile device and subsequently visualized on a display 226 of the mobile device. If desired, synchronization of the light source 112 of the device 100 with the camera 224 of the mobile device 220 is possible, e.g. via a, wired or wireless, communications link.

Herein, the invention is described with reference to specific examples of embodiments of the invention. It will, however, be evident that various modifications and changes may be made therein, without departing from the essence of the invention.

In the examples, the compensation volume or second area of the transformation layer is placed in the measurement arm of the interferometer. It is also possible that the compensation volume or second area of the transformation layer is placed in the reference arm of the interferometer. Preferably, the compensation volume or second area of the transformation layer is then still in thermal contact with the measurement volume or first area of the transformation layer.

For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. An electromagnetic imager for imaging electromagnetic radiation from an object comprising:
an unbalanced single-wavelength phase-shift laser diode interferometer including a measurement arm and a laser diode for emitting electromagnetic radiation;
entrance optics comprising a thermally controlled electromagnetic radiation input window and an output window transparent to an output wavelength of the electromagnetic radiation of the laser diode for allowing the electromagnetic radiation to enter the electromagnetic imager, comprising an image plane onto which an image of the object is to be imaged between the thermally controlled electromagnetic radiation input window and the output window, separated by a small distance from each other in a range of 1 micron to 100 micron;
wherein the output wavelength of the electromagnetic radiation of the laser diode is modulated by a direct modulation of an injection current of the laser diode,
wherein the thermally controlled electromagnetic radiation input window and the output window containing the image plane between the thermally controlled electromagnetic radiation input window and the output window is in the measurement arm; and
a transformation layer, contained between the thermally controlled electromagnetic radiation input window and the output window, at the image plane, for transforming the electromagnetic radiation from the object into a spatiotemporal variation of a refractive index of the transformation layer for causing spatiotemporal optical phase differences in the measurement arm of the unbalanced single-wavelength phase-shift laser diode interferometer representative of the image of the object, and
wherein the transformation layer is a thin layer having a thickness of microns of a solid, a liquid, a gas, or any combination thereof.

2. The electromagnetic imager of claim 1, wherein the transformation layer comprises a portion shielded from the electromagnetic radiation for generating a compensation signal from the portion.

3. The electromagnetic imager of claim 2, wherein the portion shielded from the electromagnetic radiation is located at the image plane.

4. The electromagnetic imager of claim 1, wherein the unbalanced single-wavelength phase-shift laser diode interferometer is a phase-shifting Mach-Zehnder interferometer.

5. The electromagnetic imager of claim 1, wherein the laser diode of the unbalanced single-wavelength phase-shift laser diode interferometer is configured to create phase shifts through a direct modulation of an output wavelength by a modulation of an injection current.

6. The electromagnetic imager of claim 5, further comprising a processing unit comprising a processor and memory configured to synchronize the modulated laser diode with the two-dimensional digital camera by controlling the modulation of the laser diode.

7. The electromagnetic imager of claim 1, further comprising a two-dimensional digital camera arranged for capturing an interference image generated by the unbalanced single-wavelength phase-shift laser diode interferometer.

8. The electromagnetic imager of claim 7, further comprising a processing unit comprising a processor and memory arranged for executing software instructions to process a camera signal of the two-dimensional digital camera.

9. The electromagnetic imager of claim 1, wherein the transformation layer comprises a polymer.

10. The electromagnetic imager of claim 9, wherein the polymer is a doped polymer.

11. The electromagnetic imager of claim 1, wherein the transformation layer comprises a liquid mixture.

12. The electromagnetic imager of claim 1, wherein the transformation layer comprises a colloidal suspension.

13. A method for imaging electromagnetic radiation from an object, comprising:
   imaging an electromagnetic radiation image of the object on an image plane,
   wherein the image plane is in a measurement arm of an unbalanced phase-shift interferometer, and
   wherein the unbalanced phase-shift laser diode interferometer further includes a laser diode for emitting electromagnetic radiation;
   transforming, by a transformation layer contained between a thermally controlled electromagnetic radiation input window and an output window transparent to an output wavelength of the electromagnetic radiation of the laser diode, separated by a small distance from each other in a range of 1 micron to 100 micron, at the image plane, the electromagnetic radiation from the object into a spatiotemporal variation of a refractive index of the transformation layer for causing spatiotemporal optical phase differences in the measurement arm of the unbalanced phase-shift interferometer representative of the electromagnetic radiation image of the object, wherein the transformation layer is a thin layer having a thickness of microns of a solid, a liquid, a gas, or any combination thereof; and
   generating a visible image representative of the electromagnetic radiation image of the object based on the spatiotemporal optical phase differences in the measurement arm of the unbalanced phase-shift interferometer.

14. The method of claim 13, further comprising:
   generating, in the unbalanced phase-shift interferometer, a compensation signal by shielding a portion of the transformation layer from the electromagnetic radiation from the object.

15. The method of claim 13, further comprising:
   generating a plurality of visible images, wherein a phase of an illumination light of the unbalanced phase-shift interferometer differs between individual images of the plurality of visible images; and
   generating a single visible image based on the plurality of visible images.

16. The method of claim 13, wherein the transformation layer comprises a polymer.

17. The method of claim 13, wherein the transformation layer comprises a colloidal suspension.

18. A non-transitory computer-readable medium comprising software code portions arranged for, when executed on a programmable apparatus, generating a visible image, based on an interference image generated by an unbalanced single-wavelength phase-shift laser diode interferometer of the electromagnetic imager according to claim 1.

* * * * *